(12) United States Patent
Otterspeer et al.

(10) Patent No.: US 7,810,463 B2
(45) Date of Patent: Oct. 12, 2010

(54) QUICK RESTART HCCI INTERNAL COMBUSTION ENGINE

(75) Inventors: Rob J. Otterspeer, Torslanda (SE); Lucien Koopmans, Hovas (SE)

(73) Assignee: Ford Global Technologies, LLC, Dearborn, MI (US)

( * ) Notice: Subject to any disclaimer, the term of this patent is extended or adjusted under 35 U.S.C. 154(b) by 550 days.

(21) Appl. No.: 11/925,643

(22) Filed: Oct. 26, 2007

(65) Prior Publication Data

US 2008/0173277 A1 Jul. 24, 2008

(30) Foreign Application Priority Data

Nov. 22, 2006 (EP) ............................. 06124586

(51) Int. Cl.
*F02D 41/06* (2006.01)
(52) U.S. Cl. .................. 123/179.1; 123/179.16; 123/179.18; 123/295; 123/90.1
(58) Field of Classification Search ............... 123/90.1, 123/90.11, 90.15, 179.1, 179.5, 179.16, 179.18, 123/295; 701/113
See application file for complete search history.

(56) References Cited

U.S. PATENT DOCUMENTS

| | | | |
|---|---|---|---|
| 6,050,231 A * | 4/2000 | Tisch et al. ............... | 123/179.1 |
| 6,336,436 B1 | 1/2002 | Miyakubo et al. | |
| 6,718,928 B2 * | 4/2004 | Brueggen et al. ........ | 123/179.5 |
| 7,278,388 B2 * | 10/2007 | Lewis et al. .............. | 123/179.5 |
| 7,406,937 B2 * | 8/2008 | Kulzer et al. ............. | 123/179.3 |
| 2004/0231617 A1 | 11/2004 | Kitamura et al. | |

FOREIGN PATENT DOCUMENTS

| | | |
|---|---|---|
| WO | 2004031559 | 4/2004 |
| WO | 2006096429 | 9/2006 |

* cited by examiner

*Primary Examiner*—Stephen K Cronin
*Assistant Examiner*—J. Page Hufty
(74) *Attorney, Agent, or Firm*—Allan J. Lippa; Alleman Hall McCoy Russell & Tuttle LLP (57) ABSTRACT

The invention relates to an internal combustion engine operable in homogeneous charge compression ignition (HCCI) combustion mode and in conventional spark ignited combustion mode and a method for restart of HCCI combustion therein. Whilst cranking the exhaust valve is arranged to be closed before top dead center (TDC) during an exhaust stroke. The intake valve is arranged to be opened after TDC during an induction stroke. Fuel injection control means are arranged to perform a first fuel injection after closing of the exhaust valve and before TDC of the exhaust stroke. The ignition control means are arranged to cause said spark plug to ignite the first injected quantity of fuel before said opening of the intake valve. The fuel injection control means are arranged to perform at least one further fuel injection in the interval after TDC of the exhaust stroke and before TDC of a subsequent compression stroke.

20 Claims, 5 Drawing Sheets

QUICK RESTART HCCI INTERNAL COMBUSTION ENGINE

The present application claims priority to European Patent Application No. 06124586.6, filed Nov. 22, 2006, titled "Quick Restart HCCI Internal Combustion Engine", the entire contents of each of which are incorporated herein by reference.

TECHNICAL FIELD

The present invention relates to an internal combustion engine for motor vehicles. The engine can be operated in homogeneous charge compression ignition (HCCI) combustion mode and in conventional spark ignited (SI) combustion mode. The present invention further relates to a method for controlling such an engine as well as an automotive vehicle comprising such an engine.

BACKGROUND

In order to improve thermal efficiency of gasoline internal combustion engines, lean burn is known to give enhanced thermal efficiency by reducing pumping losses and increasing the ratio of specific heat. Generally speaking, lean burn is known to give low fuel consumption and low $NO_x$ emissions. There is however a limit at which an engine can be operated with a lean air/fuel mixture because of misfire and combustion instability as a result of a slow burn. Known methods to extend the lean limit include improving ignitability of the mixture by enhancing the fuel preparation, for example using atomised fuel or vaporised fuel, and increasing the flame speed by introducing charge motion and turbulence in the air/fuel mixture. Finally, combustion by auto-ignition, or homogeneous charge compression ignition, has been proposed for operating an engine with very lean or diluted air/fuel mixtures.

When certain conditions are met within a homogeneous or close to homogenous charge of lean air/fuel mixture during low load operation, homogeneous charge compression ignition can occur wherein bulk combustion takes place initiated simultaneously from many ignition sites within the charge, resulting in very stable power output, very clean combustion and high fuel conversion efficiency. $NO_x$ emission produced in controlled homogeneous charge compression ignition combustion is extremely low in comparison with spark ignition combustion based on propagating flame front and heterogeneous charge compression ignition combustion based on an attached diffusion flame. In the latter two cases represented by spark ignition engine and diesel engine, respectively, the burnt gas temperature is highly heterogeneous within the charge with very high local temperature values creating high $NO_x$ emission. By contrast, in controlled homogeneous charge compression ignition combustion where the combustion is uniformly distributed throughout the charge from many ignition sites, the burnt gas temperature is substantially homogeneous with much lower local temperature values resulting in very low $NO_x$ emission.

Engines operating under controlled homogeneous charge compression ignition combustion have already been successfully demonstrated in two-stroke gasoline engines using a conventional compression ratio. It is believed that the high proportion of burnt gases remaining from the previous cycle, i.e., the residual content, within the two-stroke engine combustion chamber is responsible for providing the hot charge temperature and active fuel radicals necessary to promote homogeneous charge compression ignition in a very lean air/fuel mixture. In four-stroke engines, because the residual content is low, homogeneous charge compression ignition is more difficult to achieve, but can be induced by heating the intake air to a high temperature or by significantly increasing the compression ratio. This effect can also be achieved by retaining a part of the hot exhaust gas, or residuals, by controlling the timing of the intake and exhaust valves.

Homogeneous charge compression ignition combustion of a gasoline like fuel (or petrol like, or fuel with high octane number) requires a temperature of approximately 1100 K to achieve auto ignition. While it may be possible to operate in the HCCI mode over a significantly wide operating range of engine speeds and load, starting in the HCCI mode is considerably more difficult due to cold engine parts causing large heat transfer losses from the charge, and the absence of heat sources. Using the above solution, relying on exhaust gas from the previous combustion, a mode switch to normal spark ignition combustion will have to take place following every fuel cut-off, since no exhaust gas from a previous combustion will be available once the engine is to be restarted.

U.S. Pat. No. 6,336,436 discloses a gasoline engine having an actuating system including an in-cylinder fuel injection system and an ignition system, capable of changing over combustion between spark ignition combustion and compression auto ignition combustion, and a controlling system for controlling the combustion changeover. In a transition from one combustion mode to the other, the actuating system is controlled to perform transient combustion such as stratified charge combustion with fuel injection on the compression stroke, or combustion with fuel injection during a valve shut-off period during which intake and exhaust valves are both closed.

Although U.S. Pat. No. 6,336,436 deals with the transition between normal spark ignition combustion and compression auto ignition combustion and vice versa, it relies on stratified combustion as an intermediate mode to be able to move actuators, such as the throttle, to a desired setting without causing misfire. However, U.S. Pat. No. 6,336,436 is silent regarding the transition from no combustion to compression auto ignition combustion.

SUMMARY

An object of the present invention is to provide an improved internal combustion engine operable in homogeneous charge compression ignition (HCCI) combustion mode and in conventional spark ignited combustion mode with HCCI restart capability following fuel cut-off without relying on start-up using a mode switch to normal spark ignition combustion. The engine provided with at least one cylinder and comprising: fuel injecting means, for injecting fuel into a combustion chamber, of each cylinder; fuel injection control means, for controlling fuel injection quantity per combustion cycle injected using each said fuel injecting means; a piston, arranged for reciprocating action within the cylinder; at least one intake valve for admitting oxygen containing gas into the cylinder; at least one exhaust valve for exhausting combusted gases from the cylinder; ignition control means, for controlling spark ignited combustion; at least one spark plug arranged to selectively produce a spark within the combustion chamber under control of the ignition control means.

According to a first aspect of the present invention this object is achieved in accordance with the features of claim 1, which specifies that for restart of homogeneous charge compression ignition combustion operation after one or more cycles without combustion, the engine is arranged to be cranked; and the exhaust valve is arranged to be closed before top dead center during an exhaust stroke of the piston; and the intake valve is arranged to be opened after top dead center during an induction stroke of the piston, and the fuel injection control means are arranged to perform a first fuel injection after closing of the exhaust valve and before top dead center of the piston exhaust stroke; the ignition control means are arranged to cause the spark plug to ignite the first injected quantity of fuel before the opening of the intake valve; the fuel injection control means are arranged to perform at least one further fuel injection in the interval after top dead center of the piston exhaust stroke and before top dead center of a subsequent piston compression stroke.

A further object of the present invention is to provide a method for restart of homogeneous charge compression ignition combustion after one or more cycles without combustion for an internal combustion engine operable in homogeneous charge compression ignition combustion mode and in conventional spark ignited combustion mode. The engine is provided with at least one cylinder and comprising: fuel injecting means, for injecting fuel into a combustion chamber, of each cylinder; fuel injection control means, for controlling fuel injection quantity per combustion cycle injected using each said fuel injecting means; a piston, arranged for reciprocating action within the cylinder; at least one intake valve for admitting oxygen containing gas into the cylinder; at least one exhaust valve for exhausting combusted gases from the cylinder; ignition control means, for controlling spark ignited combustion; at least one spark plug arranged to selectively produce a spark within the combustion chamber under control of the ignition control means.

According to a second aspect of the present invention this object is achieved in accordance with the features of claim 6, which specifies that the method comprises the steps of, cranking the engine; and closing the exhaust valve before top dead center during an exhaust stroke of the piston; and opening the intake valve after top dead center during an induction stroke of the piston, and performing by means of the fuel injection control means a first fuel injection after closing of the exhaust valve and before top dead center of the piston exhaust stroke; igniting by the ignition control means causing the spark plug to ignite the first injected quantity of fuel before the opening of the intake valve; performing by means of the fuel injection control means at least one further fuel injection in the interval after top dead center of the piston exhaust stroke and before top dead center of a subsequent piston compression stroke.

Further embodiments are listed in the dependent claims. It will be appreciated that features of the invention are susceptible to being combined in any combination without departing from the scope of the invention as defined by the accompany claims.

BRIEF DESCRIPTION OF THE DRAWINGS

By way of example only, embodiments of the present invention will now be described with reference to the accompanying drawings wherein.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein. The same reference numerals will be used for illustrating corresponding features in the different drawings.

DETAILED DESCRIPTION

The invention concerns an internal combustion engine operable in homogeneous charge compression ignition (HCCI) combustion mode and in conventional spark ignited (SI) combustion mode.

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engine.

The engine is possible to be operated in homogeneous charge compression ignition (HCCI) combustion mode. This is a combustion mode, different than conventional spark ignited (SI) combustion mode, in order to reduce fuel consumption in combination with ultra low $NO_x$ emissions. In this mode, a mixture containing fuel, air and combustion residuals is compressed to auto ignition. HCCI combustion is characterized by many exothermal centers and the energy is released in a higher rate compared to combustion with a moving flame front originating from the sparkplug (SI). In order to slow down the heat-release rate the stoichiometric mixture must be diluted with either air (enleanment) or residuals. The dilution rate can be higher compared to an SI engine due to the lack of a moving flame-front. The increased mass reduces the maximum temperature hence increases the thermal efficiency. This reduces both pumping losses and combustion temperature hence the fuel consumption compared to an SI operated engine.

Figure 1:
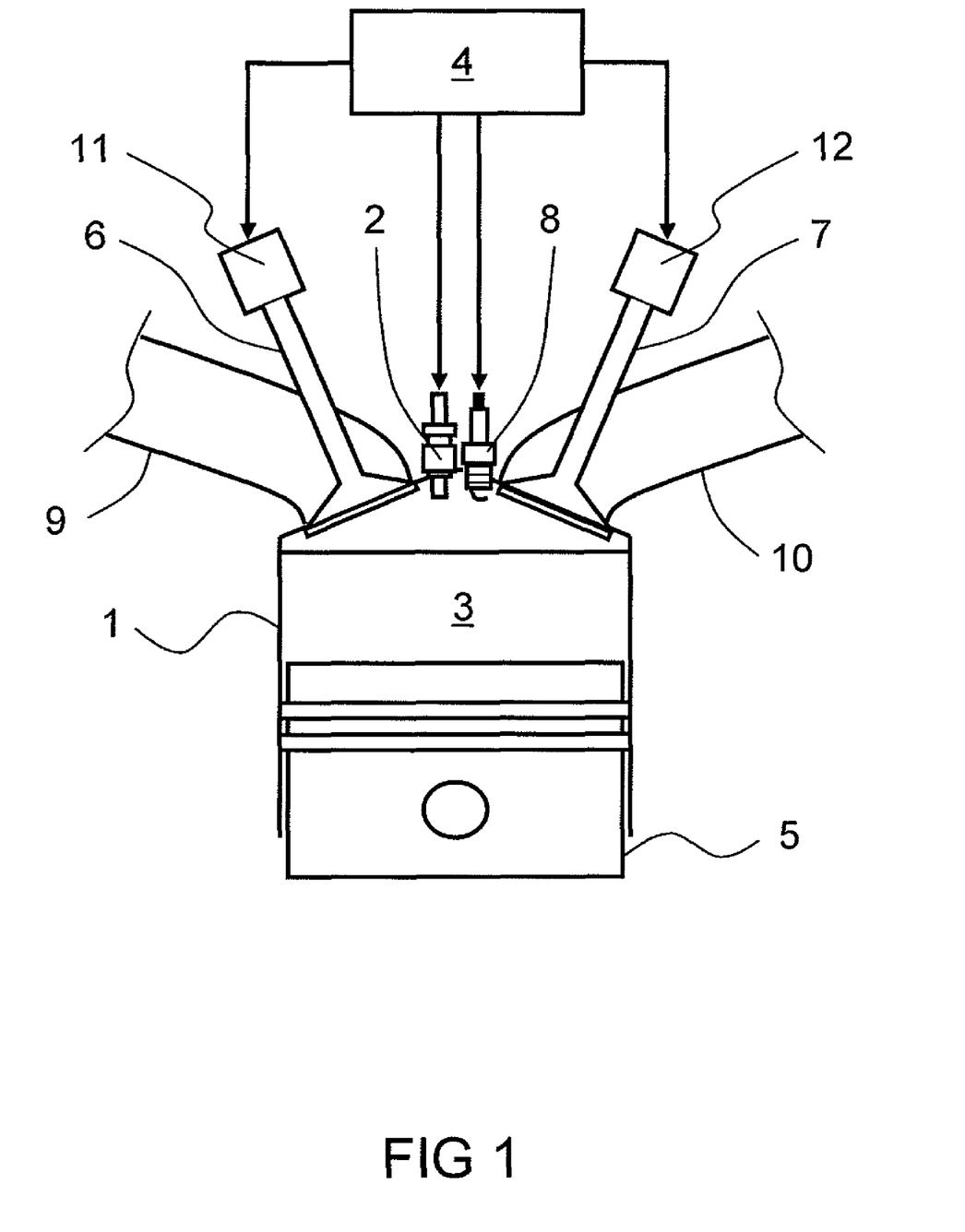
FIG. 1 is a schematic illustration of an internal combustion engine in accordance with the present invention.

FIG. 1 shows a schematic illustration of an internal combustion engine according to the invention. The engine is provided with at least one cylinder 1 and comprises fuel injecting means, such as a fuel injector 2, through which fuel is injected into a combustion chamber 3, of each cylinder 1. Fuel injection control means, such as a fuel injection control unit 4 controls fuel injection quantity per combustion cycle injected through each fuel injector 2. A piston 5 arranged for reciprocating action within in the engine cylinder 1 has a compression action that during HCCI-mode causes a mixture of air and fuel within the combustion chamber 3 to self ignite. The cylinder 1 is provided with at least one intake valve 6 for admitting oxygen containing gas, such as fresh air, into the cylinder 1 and at least one exhaust valve 7 for exhausting combusted gases from the cylinder 1. Means 11, 12 are provided for controlling timing, duration and lift of the intake valve 6 and the outlet valve 7 respectively. Air is supplied through an intake conduit 9 connected to an intake manifold (not shown), while exhaust gas is exhausted through an exhaust conduit 10 connected to an exhaust system (not shown). When operated in SI-mode, the fuel/air mixture is ignited by a spark plug 8, which is arranged to selectively produce a spark within the combustion chamber 3 under control of ignition control means, which may be integral to an engine control unit (ECU) 4.

Gas exchange within the engine is as described above controlled by at least one intake valve 6 preferably, but not necessarily, provided with variable valve timing per cylinder for admitting a combustible oxygen containing gas, such as fresh air, and at least one exhaust valve 7 preferably, but not necessarily, provided with variable valve timing per cylinder for exhausting combusted gases.

For enabling the engine to quickly be restarted and operated in a HCCI mode after one or more cycles without combustion, such as after fuel cut off, e.g. during deceleration or so called idle stop, the engine is arranged to be cranked and the exhaust valve 7 is arranged to be closed before top dead center during an exhaust stroke of the piston 5 and the intake valve 6 is arranged to be opened after top dead center during an induction stroke of the piston 5. The fuel injection control means 4 are arranged to perform a first fuel injection after closing of the exhaust valve 7 and before top dead center of the piston exhaust stroke. The ignition control means 4 are arranged to cause the spark plug 8 to ignite the first injected quantity of fuel before the opening of the intake valve 6, thus performing a first combustion during the negative valve overlap whereby hot exhaust gases are confined during the negative valve overlap, and used for heating the intake air and provide a combustion residual content, so that it is possible to initiate non-sparking HCCI operation in the subsequent piston compression stroke. The fuel injection control means 4 are thus arranged to perform at least one further fuel injection in the interval after the top dead center of the piston exhaust stroke and before top dead center of the subsequent piston compression stroke mentioned above, which further fuel injection is used for HCCI mode operation.

Combustion residuals are thus created when operating the engine with a negative valve overlap. The residuals thus created increases the temperature of the mixture of intake air and the further fuel injected so that the auto ignition temperature is reached before piston top dead center of the subsequent piston compression stroke. The negative valve overlap is thus achieved when the exhaust valve 7 is closed before top dead center during an exhaust stroke of the piston 5 and the intake valve 6 is opened after top dead center during an induction stroke of the piston 5 in the gas exchange phase of the combustion.

The valve timing for the negative overlap can be achieved by using suitable fully or partially variable valve systems, variable valve timing (VVT), and cam profile switching (CPS), hence switching from conventional SI valve timing to HCCI valve timing with a shorter valve opening duration and/or valve lift. The means 11, 12 are responsible for controlling timing, duration and lift of the intake valve 6 and the outlet valve 7 respectively.

In a preferred embodiment of the present invention the fuel injecting means are arranged to perform the first fuel injection as a stratified stoichiometric charge.

SI is particularly attractive in its ability to generate heat quickly. Since the ability to operate in the HCCI mode is strongly related to the temperature of the combustion walls (through the effects of heat transfer on charge temperature), the faster the engine can be warmed up, the faster operation can be successfully transitioned to the HCCI mode.

The present invention further relates to an automotive vehicle comprising an internal combustion engine according to any one of the above described embodiments.

Furthermore, the present invention also relates to a method for restart of homogeneous charge compression ignition combustion after one or more cycles without combustion for an internal combustion engine operable in homogeneous charge compression ignition combustion mode and in conventional spark ignited combustion mode, where the engine is provided with at least one cylinder 1 and comprises: fuel injecting means 2, for injecting fuel into a combustion chamber 3, of each cylinder 1; fuel injection control means 4, for controlling fuel injection quantity per combustion cycle injected using each said fuel injecting means 2; a piston 5, arranged for reciprocating action within the cylinder 1; at least one intake valve 6 for admitting oxygen containing gas into the cylinder 1; at least one exhaust valve 7 for exhausting combusted gases from the cylinder 1; ignition control means 4, for controlling spark ignited combustion; at least one spark plug 8 arranged to selectively produce a spark within the combustion chamber 3 under control of the ignition control means 4.

The method in accordance with the present invention comprises the steps of: cranking the engine; and closing the exhaust valve 7 before top dead center during an exhaust stroke of the piston 5; and opening the intake valve 6 after top dead center during an induction stroke of the piston 5, and performing by means of the fuel injection control means 4 a first fuel injection after closing of the exhaust valve 7 and before top dead center of the piston exhaust stroke; igniting by the ignition control means 4 causing the spark plug 8 to ignite the first injected quantity of fuel before the opening of the intake valve 6; performing by means of the fuel injection control means 4 at least one further fuel injection in the interval after top dead center of the piston exhaust stroke and before top dead center of a subsequent piston compression stroke.

In a further embodiment of the method in accordance with the present invention the first fuel injection is performed as a stratified stoichiometric charge using the fuel injecting means 2.

In a yet further embodiment of the method in accordance with the present invention the at least one further fuel injection is performed as a homogeneous charge using the fuel injecting means 2.

Figure 2:
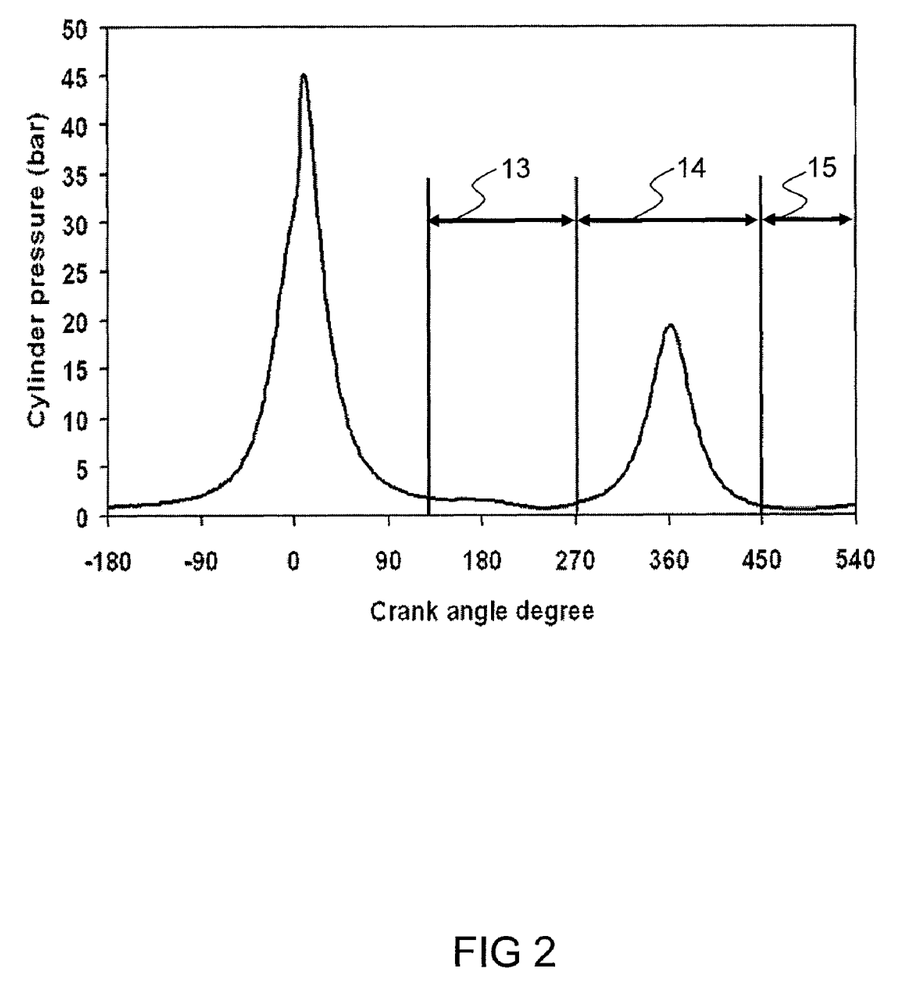
FIG. 2 is a schematic illustration of cylinder pressure against crank angle degree for the internal combustion engine according to FIG. 1.

FIG. 2 exemplifies cylinder pressure against crank angle degree during HCCI operation of the internal combustion engine according to FIG. 1. Area 13 illustrates an example crank angle interval during which the exhaust valve is open. Area 14 illustrates the negative valve overlap, and area 15 illustrates an example crank angle interval during which the intake valve is open. It should be noted that the intervals illustrated in FIG. 2 are provided only as an example and that the example valve timing is arbitrary.

Figure 3:
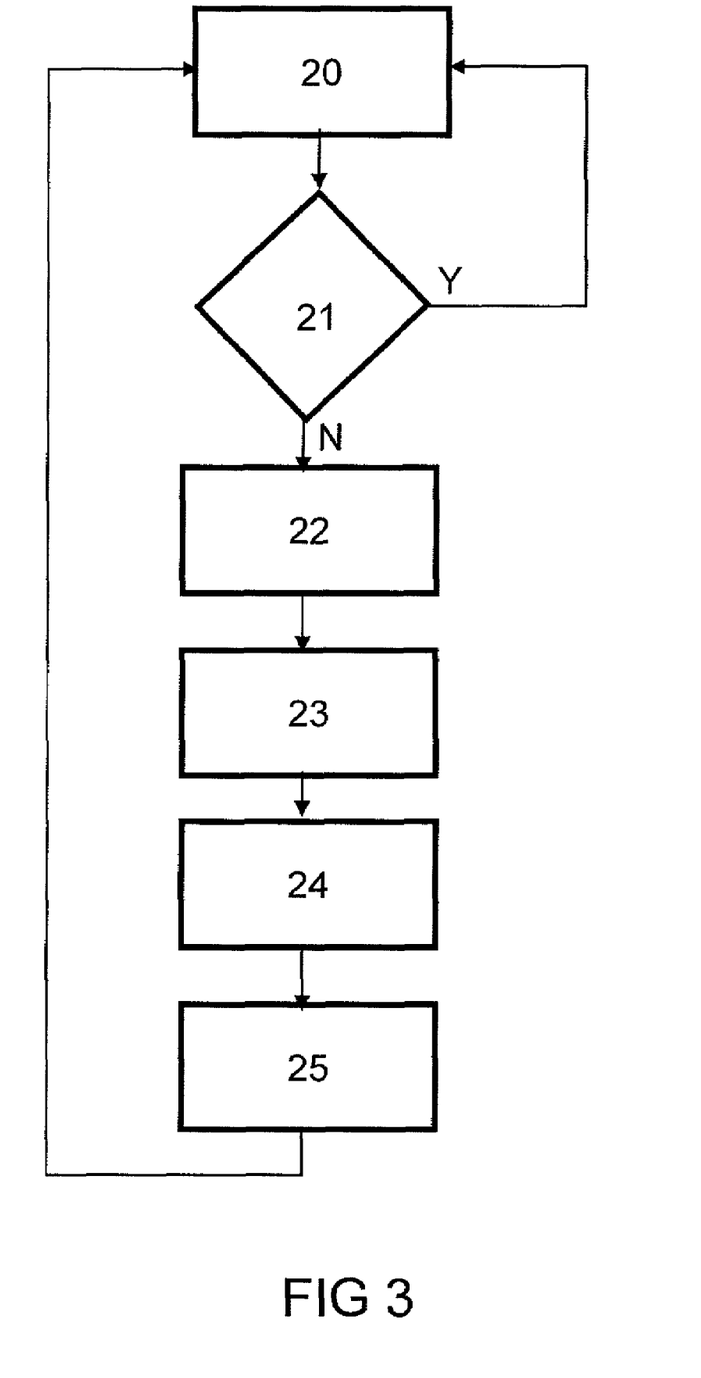
FIG. 3 is a flow chart illustrating a first restart strategy in accordance with the present invention.
Figure 4:
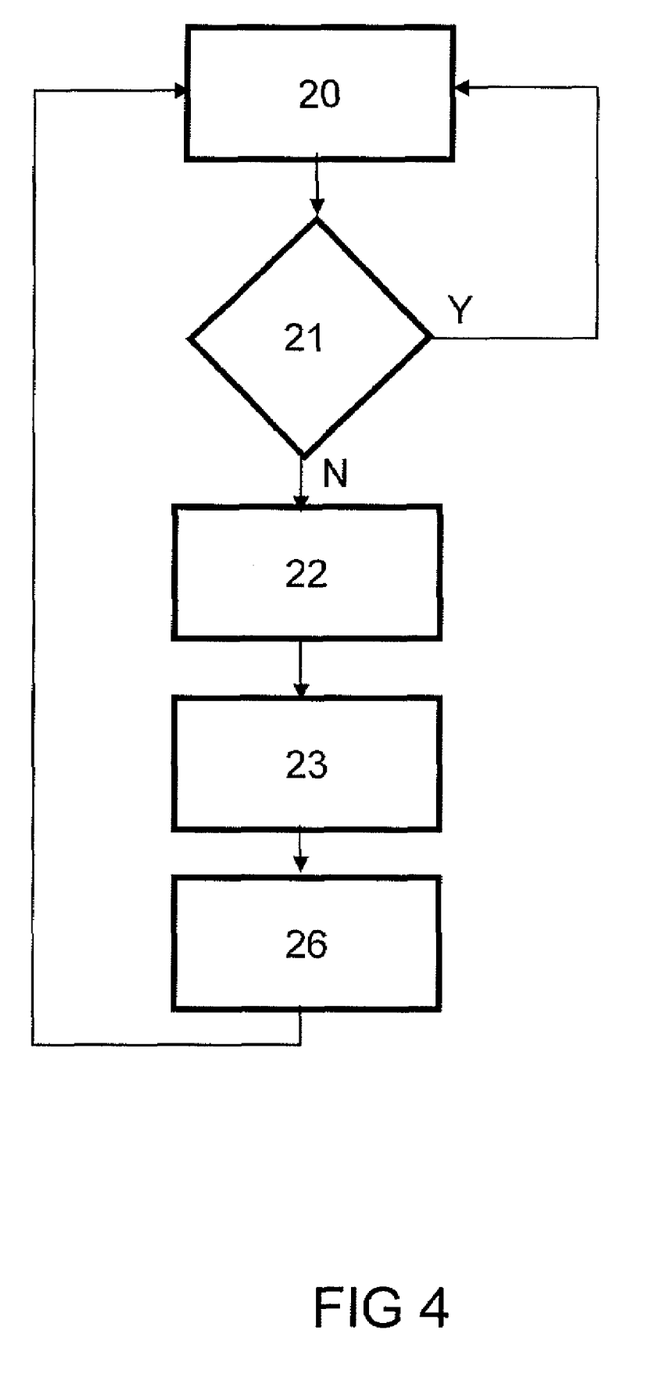
FIG. 4 is a flow chart illustrating a second restart strategy in accordance with the present invention.
Figure 5:
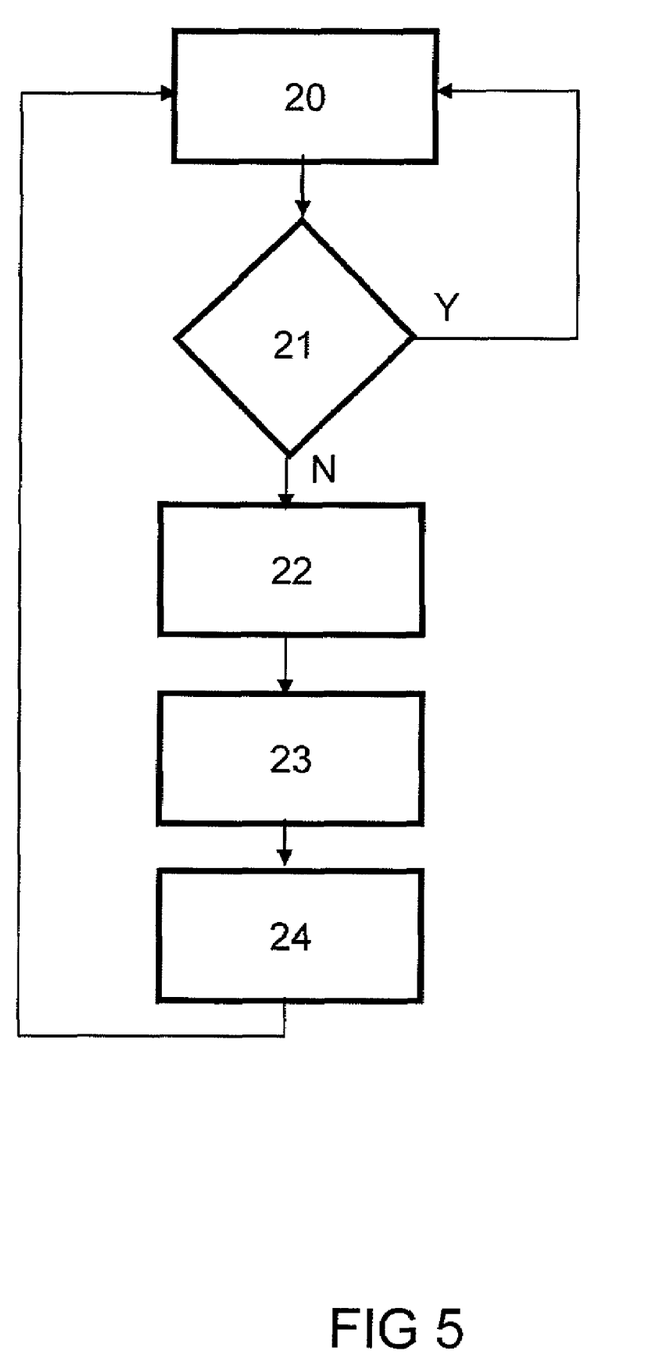
FIG. 5 is a flow chart illustrating a third restart strategy in accordance with the present invention.

FIGS. 3, 4, and 5 illustrate flow charts of restart strategies in accordance with the present invention. In accordance with these restart strategies the methods for restart starts with start block 20. At 21, it may be decided if there is combustion or not during a crank angle interval of −180-180 degrees in the diagram of FIG. 2. If it is decided that there is combustion the method loops back to start block 20, and if it is decided that there is no combustion a first fuel injection is performed at 22 such that the end of said first fuel injection occurs within the crank angle interval of 180-360 degrees in the diagram of FIG. 2. Thereafter, at 23, the ignition control means 4 are arranged to cause the spark plug 8 to ignite said first injected quantity of fuel during the crank angle interval of 180-360 degrees in the diagram of FIG. 2. Operations 20-23 are common for the different restart strategies of FIGS. 3, 4 and 5.

In a first strategy according to FIG. 3, 23 is followed by a stratified fuel injection at 24. The stratified fuel injection may be performed in the crank angle interval of −180-180 degrees in the diagram of FIG. 2, followed by an ignition spark at 25, e.g. through the ignition control means 4 being arranged to cause the spark plug 8 to ignite the further injected quantity of fuel in the interval after closing of the intake valve 6 and before top dead center of a subsequent piston compression stroke, where after the method loops back to start block 20 upon which the control routine may be repeated.

In a second restart strategy according to FIG. 4, 23 is followed by fuel injection at 26. The fuel injection may be performed in the crank angle interval of 360-540 degrees in the diagram of FIG. 2, where after the method loops back to start block 20 upon which the control routine may be repeated.

In a third restart strategy according to FIG. 5, 23 is followed by fuel injection at 24. The fuel injection may be performed in the crank angle interval of −180-180 degrees in the diagram of FIG. 2, where after the method loops back to start block 20 upon which the control routine may be repeated.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An internal combustion engine operable in homogeneous charge compression ignition combustion mode and in conventional spark ignited combustion mode provided with at least one cylinder and comprising:
   a fuel injector, for injecting fuel into a combustion chamber, of each cylinder;
   a piston, arranged for reciprocating action within said cylinder;
   at least one intake valve for admitting oxygen containing gas into said cylinder;
   at least one exhaust valve for exhausting combusted gases from said cylinder;
   at least one spark plug arranged to selectively produce a spark within said combustion chamber; and
   a control system, after one or more cycles without combustion, the control system to crank the engine to a restart position where the at least one exhaust valve is arranged to be closed before top dead center during an exhaust stroke of the piston and the at least one intake valve is arranged to be opened after top dead center during an induction stroke of the piston, to perform a first fuel injection ending after closing of the at least one exhaust valve and before top dead center of the piston exhaust stroke and to perform a spark event to ignite fuel of the first fuel injection before the opening of the at least one intake valve, and to perform at least a second fuel injection occurring in the interval after top dead center of the piston exhaust stroke and before top dead center of a subsequent piston compression stroke.

2. The internal combustion engine according to claim 1, wherein the first fuel injection is a stratified stoichiometric charge.

3. The internal combustion engine according to claim 1, wherein the second fuel injection is at least one of a homogeneous charge or a stratified charge.

4. The internal combustion engine according to claim 1, wherein the control system controls the spark plug to perform a spark event to ignite fuel of the second injection in the interval after closing of the at least one intake valve and before top dead center of a subsequent piston compression stroke.

5. A method for restart of homogeneous charge compression ignition combustion after one or more cycles without combustion for an internal combustion engine operable in homogeneous charge compression ignition combustion mode and in conventional spark ignited combustion mode provided with at least one cylinder and comprising: a fuel injector, for injecting fuel into a combustion chamber, of each cylinder, a piston, arranged for reciprocating action within said cylinder; at least one intake valve for admitting oxygen containing gas into said cylinder, at least one exhaust valve for exhausting combusted gases from said cylinder, and at least one spark plug arranged to selectively produce a spark within said combustion chamber, the method comprising:
   cranking said engine;
   closing the at least one exhaust valve before top dead center during an exhaust stroke of said piston;
   opening the at least one intake valve after top dead center during an induction stroke of said piston;
   injecting a first amount of fuel, wherein the end of injection occurs after closing of the at least one exhaust valve and before top dead center of said piston exhaust stroke;
   igniting the first amount of fuel before said opening of said intake valve; and
   injecting at least a second amount of fuel in the interval after top dead center of said piston exhaust stroke and before top dead center of a subsequent piston compression stroke.

6. The method according to claim 5, wherein injecting the first amount of fuel includes injecting a stratified stoichiometric charge.

7. The method according to claim 5, wherein injecting the second amount of fuel includes injecting at least one of a homogeneous charge and a stratified charge.

8. The method according to claim 5, further comprising:
   igniting the second amount of fuel in the interval after closing of said intake valve and before top dead center of a subsequent piston compression stroke.

9. A method for restarting an internal combustion engine operable in homogeneous charge compression ignition combustion mode and in spark ignited combustion mode utilizing homogeneous charge compression ignition combustion after one or more cycles without combustion, the internal combustion having at least one cylinder including a piston, a fuel injector for providing fuel directly into the cylinder, at least one intake valve, and at least one exhaust valve, the method comprising:

injecting a first amount of fuel into the at least one cylinder at least partially during an exhaust stroke of the piston where the at least one exhaust valve is closed;

igniting the first amount of fuel prior to opening of the at least one exhaust valve to heat a combustion chamber of the at least one cylinder to a temperature suitable for homogeneous charge compression ignition;

injecting a second amount of fuel into the at least one cylinder after the piston has reached a top dead center position of the exhaust stroke and prior to the piston reaching a top dead center position of a compression stroke; and     combusting the second amount of fuel by homogeneous charge compression ignition combustion.

10. The method according to claim 9, wherein the first amount of fuel is injected at substantially a top dead center piston position of the exhaust stroke and ignited to provide substantially no torque.

11. The method according to claim 9, further comprising:
closing the at least one intake valve and the at least one exhaust valve of the at least one cylinder after ignition of the first amount of fuel to create a negative valve overlap to retain combustion residuals in the at least one cylinder prior to injection the second amount of fuel.

12. The method according to claim 11, wherein a period of the negative valve overlap is based on the temperature of the combustion chamber.

13. The method according to claim 9, wherein at least one of the first amount of fuel and the second amount of fuel is injected as a stratified charge.

14. The method according to claim 9, wherein the first amount of injected fuel is adjusted based on cylinder temperature.

15. The method according to claim 9, wherein said compression ignition combustion occurs during an engine start.

16. The method according to claim 9, wherein said compression ignition combustion is a first torque-producing combustion event in the cylinder from an engine start.

17. The method according to claim 9, wherein the end of injection of the first amount of fuel occurs during an interval of 180-360 crank angle degrees.

18. The method according to claim 9, wherein the end of injection of the second amount of fuel occurs during an interval of 360-540 crank angle degrees.

19. The method according to claim 9, wherein the end of injection of the second amount of fuel occurs during an interval of −180-180 crank angle degrees.

20. The method according to claim 19, wherein the second amount of fuel is injected as a stratified charge.

\* \* \* \* \*